US012025362B2

(12) United States Patent
Wang et al.

(10) Patent No.: US 12,025,362 B2
(45) Date of Patent: Jul. 2, 2024

(54) REFRIGERATING AND FREEZING DEVICE

(71) Applicants: QINGDAO HAIER SPECIAL REFRIGERATOR CO., LTD, Shandong (CN); QINGDAO HAIER REFRIGERATOR CO., LTD., Shandong (CN); HAIER SMART HOME CO., LTD., Shandong (CN)

(72) Inventors: Haijuan Wang, Qingdao (CN); Kunkun Zhao, Qingdao (CN); Sen Mu, Qingdao (CN); Peng Li, Qingdao (CN)

(73) Assignees: QINGDAO HAIER SPECIAL REFRIGERATOR CO., LTD, Qingdao (CN); QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 397 days.

(21) Appl. No.: 17/431,243

(22) PCT Filed: Feb. 11, 2020

(86) PCT No.: PCT/CN2020/074737
§ 371 (c)(1),
(2) Date: Aug. 16, 2021

(87) PCT Pub. No.: WO2020/168944
PCT Pub. Date: Aug. 27, 2020

(65) Prior Publication Data

US 2022/0136755 A1 May 5, 2022

(30) Foreign Application Priority Data

Feb. 19, 2019 (CN) ......................... 201920210463.9

(51) Int. Cl.
*F25D 11/02* (2006.01)
*F25D 23/12* (2006.01)
*H05B 6/12* (2006.01)

(52) U.S. Cl.
CPC .............. *F25D 11/02* (2013.01); *F25D 23/12* (2013.01); *H05B 6/12* (2013.01)

(58) Field of Classification Search
CPC .......... F25D 31/005; F25D 11/02; H05B 6/12
See application file for complete search history.

(56) References Cited

U.S. PATENT DOCUMENTS 4,002,199 A * 1/1977 Jacobs .................... F25D 23/12 219/218
4,303,820 A * 12/1981 Stottmann ................ H05B 6/48 219/771

(Continued)

FOREIGN PATENT DOCUMENTS

CN 1412508 A 4/2003
CN 101043806 A 9/2007

(Continued)

OTHER PUBLICATIONS

International Search Report for PCT/CN2020/074737 (ISA/CN) dated Apr. 22, 2020 (5 pages).

(Continued)

*Primary Examiner* — Nelson J Nieves
(74) *Attorney, Agent, or Firm* — ALSTON & BIRD LLP

(57) ABSTRACT

A refrigerating and freezing device (1) is provided, which includes: a cabinet body, wherein at least one storage compartment (11) is defined in the cabinet body, and a heating cavity configured to accommodate a to-be-processed object is defined in one of the storage compartments (11); and an electromagnetic heating device, configured to pro- (Continued)

vide electromagnetic waves into the heating cavity to heat the to-be-processed object, wherein the electromagnetic heating device is provided with an electromagnetic generation module (21) configured to generate an electromagnetic wave signal and a power supply module (24) configured to provide a power source to the electromagnetic generation module (21). An accommodation groove (12) with a backward opening is formed in a back of the cabinet body (10), the backward opening of the accommodation groove (12) is covered with a cover body (13) to define an accommodation space (14) between the accommodation groove (12) and the cover body (13), and heat dissipation holes configured to achieve communication between the accommodation space (14) and an external environment where the cabinet body (10) is located are formed in the cover body (13). The power supply module (24) is disposed in the accommodation space (14), and a heat dissipation fan (31) is further disposed in the accommodation space (14) and is configured to drive airflow to flow between the accommodation space (14) and the external environment where the cabinet body (10) is located through the heat dissipation holes, so as to dissipate heat from the power supply module (24), and the heat dissipation efficiency is improved.

9 Claims, 4 Drawing Sheets

(56) References Cited

U.S. PATENT DOCUMENTS

| | | | | |
|---|---|---|---|---|
| 11,197,352 | B2 | 12/2021 | Xu et al. | |
| 2009/0266095 | A1* | 10/2009 | Pruneri | A23L 3/3418 62/449 |
| 2013/0160467 | A1* | 6/2013 | Hall | F25D 31/005 62/3.1 |
| 2016/0123660 | A1* | 5/2016 | Peng | A47J 27/004 219/623 |
| 2019/0101325 | A1* | 4/2019 | Piel | H05B 6/62 |
| 2023/0243584 | A1* | 8/2023 | Ji | H05B 6/62 62/132 |

FOREIGN PATENT DOCUMENTS

| | | | |
|---|---|---|---|
| CN | 201237415 | Y | 5/2009 |
| CN | 207095130 | U | 3/2018 |
| CN | 207247701 | U | 4/2018 |
| CN | 109323517 | A | 2/2019 |
| CN | 209893721 | U | 1/2020 |
| EP | 3348933 | A2 | 7/2018 |
| JP | S58-106375 | A | 6/1983 |
| JP | S61-213475 | A | 9/1986 |
| JP | S63-223479 | A | 9/1988 |
| JP | 10238922 | A | 9/1998 |
| JP | 2002-090030 | | 3/2002 |
| WO | WO 2018/223946 | A1 | 12/2018 |

OTHER PUBLICATIONS

Supplementary European Search Report for EP Application No. 20759423.5 dated Mar. 31, 2022 (4 pages).

1st Office Action for EP Application No. 20759423.5 dated Apr. 12, 2022 (6 pages).

1st Office Action for Australia Patent Application No. 2020224231 dated May 13, 2022 (3 pages).

1st Office Action for India Patent Application No. 202137037664 dated Feb. 28, 2022 w/English translation (6 pages).

1st Office Action for Japan Patent Application No. 2021-547556 (4 pages).

* cited by examiner

REFRIGERATING AND FREEZING DEVICE

TECHNICAL FIELD

The present invention relates to the field of refrigeration and freezing, and in particular to a refrigerating and freezing device.

BACKGROUND ART

In the freezing process of food, the quality of the food is kept; however, the frozen food needs to be heated before being processed or eaten. In order to facilitate freezing and heating of food by a user, the prior art generally heats the food by providing a heating device or a microwave device in a refrigerating and freezing device such as a refrigerator. However, heating the food by the heating device generally needs a long heating time, and the heating time and temperature are not easy to control, which easily causes water evaporation and juice loss of the food, and the quality of the food is lost. Heating the food by the microwave device is fast and efficient, so the loss of nutrients in the food is very low. But the problems of non-uniform heating and local overheating easily occur due to the fact that the penetration of microwaves to water and ice and the absorption of water and ice to microwaves are different, the distribution of internal substances of the food is not uniform, and much energy is absorbed by a thawed area.

In order to avoid the above problems, the applicant of the present application previously proposed an electromagnetic heating mode with better heating effect. However, the previous electromagnetic heating device will occupy too much heating space, and the heat generated by the electromagnetic heating device is not easy to dissipate, thereby affecting the heating effect.

SUMMARY OF THE INVENTION

One objective of the present invention is to overcome at least one of the defects of the prior art and to provide a refrigerating and freezing device with a large heating space and high space utilization rate.

Another objective of the present invention is to rapidly and effectively cool a power supply module, so as to improve the power supply efficiency and prolong the service life of the power supply module.

A further objective of the present invention is to prevent the power supply module from getting damp or attracting dust.

In order to achieve the above objectives, the present invention provides a refrigerating and freezing device, which includes:

- a cabinet body, wherein at least one storage compartment is defined in the cabinet body, and a heating cavity configured to accommodate a to-be-processed object is defined in one of the storage compartments; and
- an electromagnetic heating device, configured to provide electromagnetic waves into the heating cavity to heat the to-be-processed object in the heating cavity, the electromagnetic heating device being provided with an electromagnetic generation module configured to generate an electromagnetic wave signal and a power supply module configured to provide a power source to the electromagnetic generation module; wherein
- an accommodation groove with a backward opening is formed in a back of the cabinet body, the backward opening of the accommodation groove is covered with a cover body to define an accommodation space between the accommodation groove and the cover body, and heat dissipation holes configured to achieve communication between the accommodation space and an external environment where the cabinet body is located are formed in the cover body; and
- the power supply module is disposed in the accommodation space, and a heat dissipation fan is further disposed in the accommodation space and is configured to drive airflow to flow between the accommodation space and the external environment where the cabinet body is located through the heat dissipation holes, so as to dissipate heat from the power supply module.

Optionally, the heat dissipation holes include an air inlet hole formed in a bottom of the cover body and an air outlet hole formed in a top of the cover body, so as to allow the airflow driven by the heat dissipation fan to enter the accommodation space through the air inlet hole and flow out through the air outlet hole, so as to carry out forced convection heat dissipation on the power supply module.

Optionally, both the air inlet hole and the air outlet hole are strip-shaped holes extending in a transverse direction.

Optionally, both the air inlet hole and the air outlet hole extend in the transverse direction, and are divided into a plurality of sub air inlets and a plurality of sub air outlets by a plurality of separation ribs disposed in the transverse direction side by side.

Optionally, both the air inlet hole and the air outlet hole are covered with water retaining ribs, and bottoms of the water retaining ribs are spaced from a backward surface of the cover body, so as to allow the airflow to flow through.

Optionally, the water retaining ribs are arc water retaining ribs protruded and bent backwards from the backward surface of the cover body from top to bottom.

Optionally, the heat dissipation fan is disposed at a top of the power supply module; and the heat dissipation fan is an axial flow fan.

Optionally, the power supply module includes a printed circuit board (PCB) configured to integrate a power source processing circuit, the PCB is provided with an input terminal configured to be connected with a power supply source and an output terminal configured to be connected with the electromagnetic generation module, so that a power voltage input by the input terminal is processed by the power source processing circuit on the PCB and then output to the electromagnetic generation module by the output terminal.

Optionally, a storage device with a cylinder body and a door body is placed in one of the storage compartments, and the heating cavity is formed in the storage device.

The electromagnetic heating device further includes a radiation antenna and a signal processing and measurement control circuit disposed in the cylinder body, the radiation antenna is electrically connected with the signal processing and measurement control circuit, and the electromagnetic generation module is electrically connected with the signal processing and measurement control circuit and is then electrically connected with the radiation antenna.

Optionally, the electromagnetic generation module is disposed at an outer side of a foaming layer of the cabinet body, and the electromagnetic generation module is electrically connected with the signal processing and measurement control circuit through a wire predisposed in the foaming layer of the cabinet body.

The refrigerating and freezing device of the present invention is provided with the electromagnetic heating device, which heats and thaws the to-be-processed object through electromagnetic waves. The heating efficiency is high, the heating is uniform, and the food quality can be guaranteed. Specifically, the power supply module configured to supply power to the electromagnetic generation module is disposed in the accommodation space formed by the accommodation groove in the back of the cabinet body and a cover plate, that is, the power supply module is located outside the cabinet body and does not occupy a storage space in the cabinet body or a heating space in the heating cavity. Both the storage space and the heating space are relatively large, and the space utilization rate is high.

Meanwhile, due to the fact that the power supply module is located outside a rear side of the cabinet body, heat generated by the power supply module will not be dissipated in the cabinet body to influence the storage temperature in the storage compartments. More importantly, the heat dissipation holes are formed in the cover body, and the heat dissipation fan is further disposed in the accommodation space. The airflow can be driven by the heat dissipation fan to flow more rapidly, so as to promote the heat generated by the power supply module to be dissipated to an external environment space more rapidly. Therefore, the power supply module is cooled rapidly and effectively, the decrease of service life and efficiency caused by temperature rise during continuous working of the power supply module is completely eradicated, and meanwhile burn hazards caused by unintentional touch by users are completely eradicated.

Further, the power supply module is covered with the cover body, so that the power supply module can be prevented from being drenched or attracting dust and the like to a certain extent. The air inlet hole and the air outlet hole of the cover body are specifically covered with the water retaining ribs, so that water at the back of the cabinet body can be prevented from immersing into the accommodation space, causing the power supply module to get damp or attract dust, and even causing unnecessary potential safety hazards.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In the drawings.

DETAILED DESCRIPTION OF THE INVENTION

Figure 1:
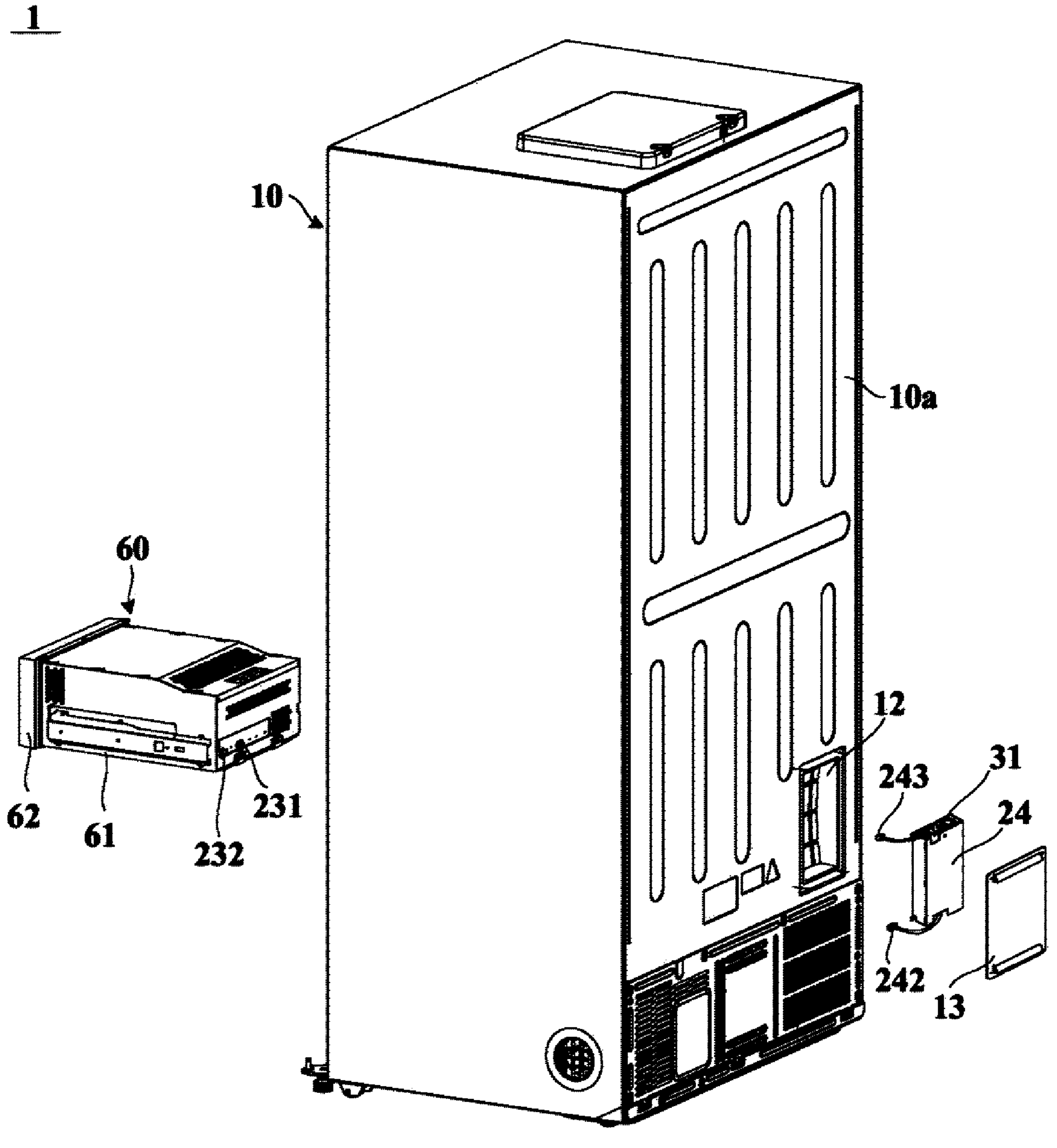
FIG. 1 is a schematic structural diagram of a refrigerating and freezing device according to one embodiment of the present invention.

The present invention provides a refrigerating and freezing device. The refrigerating and freezing device may be a refrigerator, a freezer or other storage devices with refrigerating and/or freezing functions. FIG. 1 is a schematic structural diagram of a refrigerating and freezing device according to one embodiment of the present invention, and FIG. 2 is a schematic sectional view of a refrigerating and freezing device according to one embodiment of the present invention.

Figure 2:
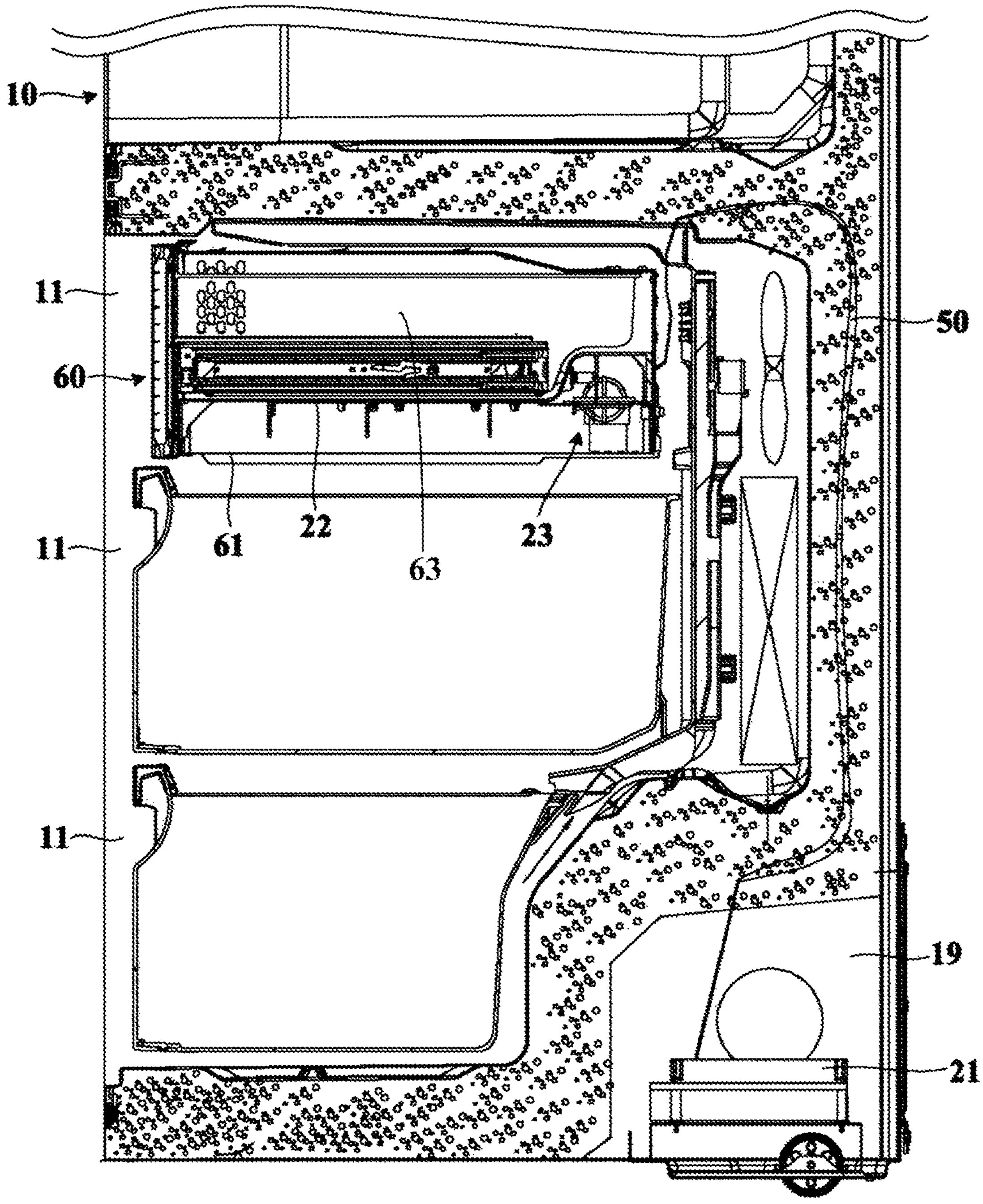
FIG. 2 is a schematic sectional view of a refrigerating and freezing device according to one embodiment of the present invention.

With reference to FIGS. 1-2, a refrigerating and freezing device 1 of the present invention includes a cabinet body 10. At least one storage compact went 11 is defined in the cabinet body 10. Further, the refrigerating and freezing device 1 may further includes a door body for opening and/or closing the storage compartments 11. A heating cavity 63 configured to accommodate a to-be-processed object is defined in one of the storage compartments 11. The heating cavity 63 can heat and thaw the to-be-processed object. Specifically, a plurality of storage compartments 11 can be defined in the cabinet body 10, including, for example, a refrigerating compartment, a freezing compartment and a variable temperature compartment. The temperatures of the above compartments are different from one another, and therefore are different in functions. The heating cavity 63 may be formed in any one of the refrigerating compartment, the freezing compartment and the variable temperature compartment.

Further, the refrigerating and freezing device 1 further includes an electromagnetic heating device configured to provide electromagnetic waves into the heating cavity 63 to heat the to-be-processed object in the heating cavity 63. The electromagnetic waves provided by the electromagnetic heating device may be electromagnetic waves having a suitable wavelength such as a radio frequency wave, a microwave, and the like. According to a method for heating the to-be-processed object by utilizing the electromagnetic waves, the heating efficiency is high, heating is uniform, and the food quality can be guaranteed. The electromagnetic heating device generally is provided with an electromagnetic generation module 21 configured to generate an electromagnetic wave signal and a power supply module 24 configured to provide a power source to the electromagnetic generation module 21. Because both the electromagnetic generation module 21 and the power supply module 24 have relatively large power, and generate more heat, the electromagnetic generation module 21 and the power supply module 24 may be disposed at an outer side of a foaming layer of the cabinet body 10, so that the storage environment in the cabinet body 10 is prevented from being influenced, and meanwhile heat dissipation is facilitated. The electromagnetic generation module 21 may be disposed, for example, outside a top of the cabinet body 10, outside a back of the cabinet body or inside a compressor bin 19, and the like.

Specifically, an accommodation groove 12 with a backward opening is formed in the back of the cabinet body 10. The backward opening of the accommodation groove 12 is covered with a cover body 13 to define an accommodation space 14 between the accommodation groove 12 and the cover body 13, and heat dissipation holes configured to achieve communication between the accommodation space 14 and an external environment where the cabinet body 10 is located are formed in the cover body 13. The power supply module 24 is disposed in the accommodation space 14. A heat dissipation fan 31 is further disposed in the accommodation space 14 and is configured to drive airflow to flow between the accommodation space 14 and the external environment where the cabinet body 10 is located through the heat dissipation holes, so as to dissipate heat from the power supply module 24.

Due to the fact that the power supply module 24 configured to provide the power source to the electromagnetic generation module 21 is disposed in the accommodation space 14 formed by the accommodation groove 12 in the back of the cabinet body 10 and the cover body 13, that is, the power supply module 24 is located outside a rear side of the cabinet body 10, it does not occupy a storage space in the cabinet body 10 or a heating space in the heating cavity 63. Thus, both the storage space and the heating space are relatively large, and the space utilization rate is high.

Meanwhile, due to the fact that the power supply module 24 with a large heat generation amount is located outside the rear side of the cabinet body 10, heat generated by the power supply module will not be dissipated in the cabinet body 10 to influence the storage temperature in the storage compartments. More importantly, the heat dissipation holes are formed in the cover body 13, and the heat generated by the power supply module 24 can be dissipated through the heat dissipation holes. Further, the heat dissipation fan 31 is further disposed in the accommodation space 14. The airflow can be driven by the heat dissipation fan 31 to flow more rapidly, so as to promote the heat generated by the power supply module 24 to be dissipated to an external environment space more rapidly. Therefore, the power supply module 24 is cooled rapidly and effectively, the decrease of service life and efficiency caused by temperature rise during continuous working of the power supply module 24 is completely eradicated, and meanwhile burn hazards caused by unintentional touch by users are completely eradicated. The power supply module 24 can also be prevented from being seen by the users through being disposed outside the rear side of the cabinet body 10, and thus overall appearance of the refrigerating and freezing device and use experience of the users are improved.

Further, the cover body 13 can keep flush with a backward outer surface 10*a* of the cabinet body 10, which can not only improve the overall appearance of the refrigerating and freezing device 1, but also prevent the problem that the cabinet body 10 occupies too much space due to the arrangement of the power supply module 24.

Figure 3:
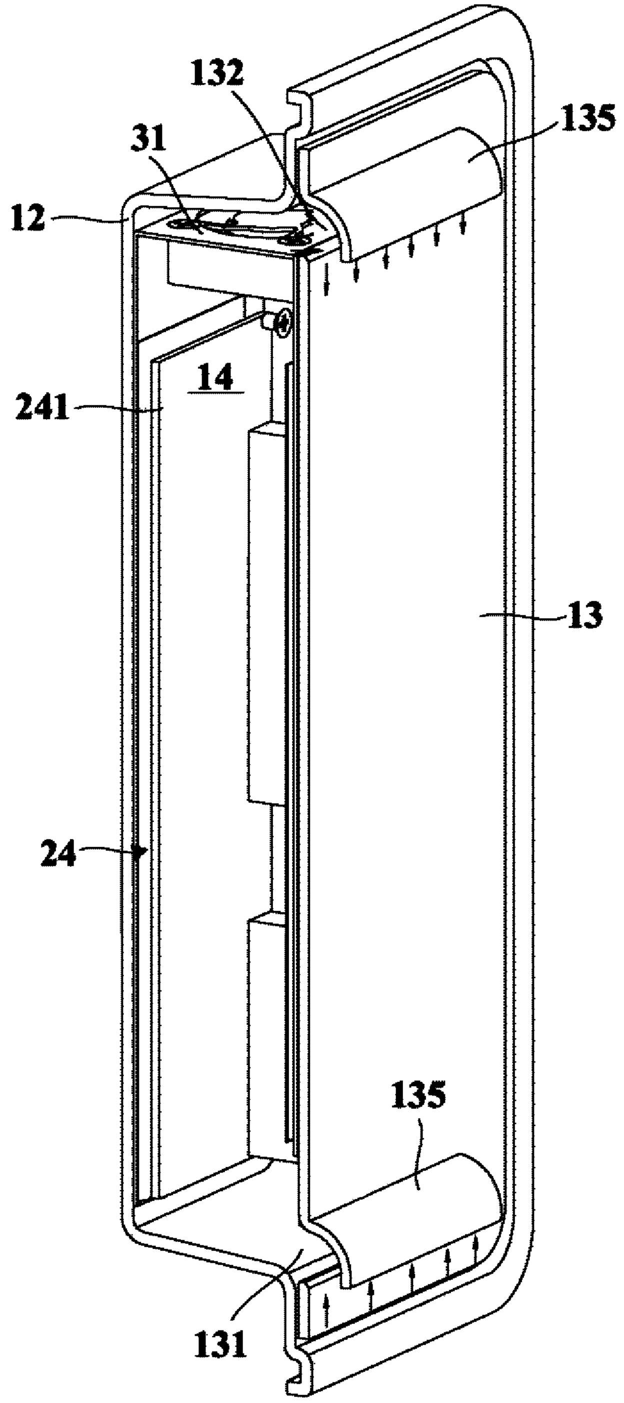
FIG. 3 and FIG. 4 are schematic sectional views of an accommodation groove and a cover body in different directions according to one embodiment of the present invention.
Figure 4:
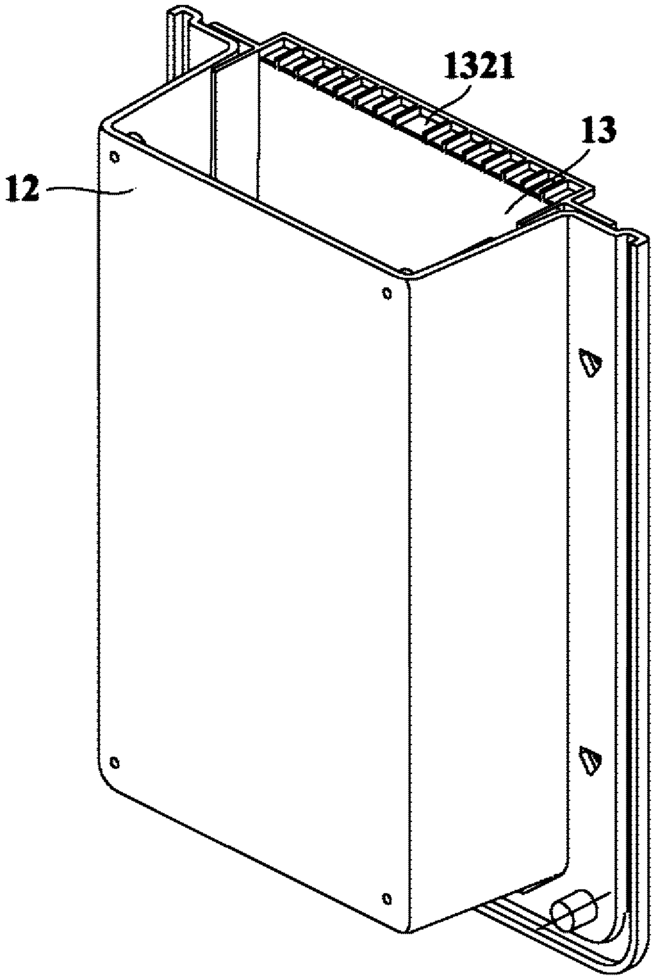

FIG. 3 and FIG. 4 are schematic sectional views of the accommodation groove and the cover body in different directions according to one embodiment of the present invention. Sectional cutting lines along which FIG. 3 and FIG. 4 are taken are perpendicular to each other. A straight arrow in FIG. 3 indicates a general flow direction of the airflow, and the power supply module is hidden in the FIG. 4. With reference to FIGS. 1-4, the above heat dissipation holes include an air inlet hole 131 formed in a bottom of the cover body 13 and an air outlet hole 132 formed in a top of the cover body 13, so as to allow the airflow driven by the heat dissipation fan 31 to enter the accommodation space 14 through the air inlet hole 131 and flow out through the air outlet hole 132, so as to carry out forced convection heat dissipation on the power supply module 24. That is, the air inlet hole 131 and the air outlet hole 132 can be disposed in two opposite side portions of the cover body 13, which is convenient for the airflow to form a convection effect, thereby increasing the flow speed of the airflow, and further improving the heat dissipation efficiency of the power supply module 24. According to the principle that hot airflow rises, the air inlet hole 131 and the air outlet hole 132 are formed up and down, which is beneficial to rapid flow of the airflow. In addition, the air outlet hole 132 is specifically formed in the top of the cover body 13, and the air inlet hole 131 is specifically formed in the bottom of the cover body 13, so that the airflow with heat sent out through the air outlet hole 132 does not pass through the air outlet hole 131 but directly rises, and the heat is prevented from entering the accommodation space 14 again to affect the heat dissipation effect.

In some embodiments, both the air inlet hole 131 and the air outlet hole 132 may be strip-shaped holes extending in a transverse direction, which not only increases the areas of the air inlet hole and the air outlet hole, and improves the flow speed of the airflow, but also enables the airflow to uniformly flow to the power supply module 24 after flowing into the accommodation space 14 and to uniformly flow out, and improves heat dissipation balance of the power supply module 24.

In other embodiments, both the air inlet hole 131 and the air outlet hole 132 may extend in the transverse direction, and are divided into a plurality of small sub air inlets and a plurality of small sub air outlets 1321 by a plurality of separation ribs disposed in the transverse direction side by side. In this way, not only can a uniform air supply and balanced heat dissipation effect be played, but also unnecessary safety hazards brought by the fact that the air inlet hole 131 and the air outlet hole 132 are too large (for example, fingers can put in) can be avoided.

In some embodiments, both the air inlet hole 131 and the air outlet hole 132 are covered with water retaining ribs 135. Bottoms of the water retaining ribs 135 are spaced from a backward surface of the cover body 13, so that a gap is formed between bottom walls of the water retaining ribs 135 and the backward surface of the cover body 13 to allow the airflow to flow through. Due to the arrangement of the cover body 13, the power supply module 24 can be prevented from being drenched or attracting dust and the like to a certain extent. The air inlet hole 131 and the air outlet hole 132 of the cover body 13 are specifically covered with the water retaining ribs 135. The arrangement of the water retaining ribs 135 will not affect normal flow of the airflow, and can prevent water on the rear side of the cabinet body 10 from immersing into the accommodation space 14, causing the power supply module 24 to get damp or attract dust, and even causing unnecessary potential safety hazards.

Further, the water retaining ribs 135 may be arc water retaining ribs protruded and bent backwards from the backward surface of the cover body 13 from top to bottom. The water retaining ribs 135 in this shape are not only beautiful in shape, but also beneficial to flowing down of water on the water retaining ribs, so as to avoid accumulation of water drops on the water retaining ribs 135.

In some embodiments, the heat dissipation fan 31 is disposed at a top of the power supply module 24. Specifically, an air inlet of the heat dissipation fan 31 is downward, and an air outlet of the heat dissipation fan is upward, so as to be beneficial to driving the airflow to rapidly flow in the accommodation space from bottom to top.

In some embodiments, the heat dissipation fan 31 may be an axial flow fan. In other embodiments, the heat dissipation fan 31 may also be other types of fans, such as a centrifugal fan, a cross-flow fan, and the like as long as an air path of the heat dissipation fan is arranged such that the air outlet and the air inlet thereof face upwards and downwards respectively.

Further, the number of the heat dissipation fan 31 is one, two, three or more.

In some embodiments, the power supply module 24 may include a printed circuit board (PCB) 241 configured to integrate a power source processing circuit. The PCB 241 is provided with an input terminal 242 configured to be connected with a power supply source and an output terminal

243 configured to be connected with the electromagnetic generation module 21, so that a power voltage input by the input terminal 242 is processed by the power source processing circuit on the PCB 241 and then output to the electromagnetic generation module 21 by the output terminal 243. Specifically, the input terminal 242 and the output terminal 243 may be located at two opposite ends of the PCB 241 respectively.

In some embodiments, a storage device 60 with a cylinder body 61 and a door body 62 is placed in one of the storage compartments 11. The heating cavity 63 is formed in the storage device 60. During heating processing, the door body 62 closes the cylinder body 61, so that a closed heating cavity 63 is formed, and electromagnetic leakage is avoided.

Further, the electromagnetic heating device further includes a radiation antenna 22 and a signal processing and measurement control circuit 23 which are disposed in the cylinder body 61. The radiation antenna 22 is electrically connected with the signal processing and measurement control circuit 23. The electromagnetic generation module 21 is electrically connected with the signal processing and measurement control circuit 23 and is then electrically connected with the radiation antenna 22.

Further, the electromagnetic generation module 21 may be disposed at the outer side of the foaming layer of the cabinet body 10. The electromagnetic generation module 21 may be electrically connected with the signal processing and measurement control circuit 23 through a wire 50 predisposed in the foaming layer of the cabinet body 10. Specifically, the electromagnetic generation module 21 may be disposed in the compressor bin 19. The electromagnetic generation module 21 and the power supply module 24 are connected through a power line predisposed in the foaming layer of the cabinet body 10.

Specifically, the signal processing and measurement control circuit 23 is provided with a first radio frequency port 231 and a first signal transmission interface 232 which are led out from a rear wall of the storage device 60. The electromagnetic generation module 21 is provided with a second radio frequency port and a second signal transmission interface. The first radio frequency port 231 is connected with the second radio frequency port through a radio frequency cable predisposed in the foaming layer of the cabinet body 10, and the first signal transmission interface 232 is connected with the second signal transmission interface through a signal transmission cable predisposed in the foaming layer of the cabinet body 10.

The cylinder body 61 may be provided with a pick-and-place opening for facilitating the picking and placing of objects. The door body 62 may include an end plate having conductivity. When the door body 62 is closed, the end plate closes the pick-and-place opening of the cylinder body 61, thereby closing the heating cavity 63 in the cylinder body 61. The end plate may be a metal end plate made of a conductive metal material or may be a conductive end plate made of other conductive materials. The door body 41 further includes at least one conductive connector electrically connected with the end plate. The conductive connector is configured to be electrically connected with the cylinder body 61 at least when the door body 62 is in a closed state of closing the pick-and-place opening of the cylinder body 61, so that the cylinder body 61 and the door body 62 form a continuously conductive shield when the door body 62 is in the closed state. Therefore, it can be guaranteed that stable electrical connection is formed between the cylinder body 61 and the door body 62, so that the continuously conductive shield is formed during heating, electromagnetic waves are prevented from being emitted through a gap, electromagnetic radiation is effectively shielded, and damage of electromagnetic radiation to a human body is eliminated. The cylinder body 61 may be a metallic cylinder body or a non-metallic cylinder body provided thereon with electromagnetic shielding features such as a conductive coating, a conductive metal mesh and the like.

Those skilled in the art should understand that unless otherwise specified, the terms "top", "bottom", "inner", "outer", "lateral", "front", "rear", etc. used to represent the orientation or position relationship in the embodiments of the present invention are based on the actual use state of the refrigerating and freezing device 1. These terms are only for facilitating the description and understanding of the technical solutions of the present invention, rather than indicating or implying that the device or component referred to must have a specific orientation, and therefore cannot be understood as limiting the present invention.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and deemed to cover all these other variations or modifications.

The invention claimed is:

1. A refrigerating and freezing device, comprising:

a cabinet body, wherein at least one storage compartment is defined in the cabinet body and a heating cavity configured to accommodate a to-be-processed object is defined in one of the storage compartments; and an electromagnetic heating device, configured to provide electromagnetic waves into the heating cavity to heat the to-be-processed object in the heating cavity, wherein the electromagnetic heating device is provided with an electromagnetic generation module configured to generate an electromagnetic wave signal and a power supply module configured to provide a power source to the electromagnetic generation module; wherein an accommodation groove with a backward opening is formed in a back of the cabinet body, the backward opening of the accommodation groove is covered with a cover body to define an accommodation space between the accommodation groove and the cover body, and heat dissipation holes configured to achieve communication between the accommodation space and an external environment where the cabinet body is located are formed in the cover body; and the power supply module is disposed in the accommodation space, and a heat dissipation fan is further disposed in the accommodation space and is configured to drive airflow to flow between the accommodation space and the external environment where the cabinet body is located through the heat dissipation holes, so as to dissipate heat from the power supply module, wherein the heat dissipation holes comprise an air inlet hole and an air outlet hole, both the air inlet hole and the air outlet hole are covered with water retaining ribs, and bottoms of the water retaining ribs are spaced from a backward surface of the cover body, so as to allow an airflow to flow through.

2. The refrigerating and freezing device according to claim 1, wherein the air inlet hole is formed in a bottom of the cover body and the air outlet hole is formed in a top of the cover body, so as to allow the airflow driven by the heat dissipation fan to enter the accommodation space through the air inlet hole and flow out through the air outlet hole, so as to carry out forced convection heat dissipation on the power supply module.

3. The refrigerating and freezing device according to claim 2, wherein both the air inlet hole and the air outlet hole are strip-shaped holes extending in a transverse direction.

4. The refrigerating and freezing device according to claim 2, wherein both the air inlet hole and the air outlet hole extend in a transverse direction, and are divided into a plurality of sub air inlets and a plurality of sub air outlets by a plurality of separation ribs disposed in the transverse direction side by side.

5. The refrigerating and freezing device according to claim 1, wherein the water retaining ribs are arc water retaining ribs protruded and bent backwards from the backward surface of the cover body from top to bottom.

6. The refrigerating and freezing device according to claim 1, wherein the heat dissipation fan is disposed at a top of the power supply module; and the heat dissipation fan is an axial flow fan.

7. The refrigerating and freezing device according to claim 1, wherein the power supply module comprises a printed circuit board (PCB) configured to integrate a power source processing circuit, the PCB is provided with an input terminal configured to be connected with a power supply source and an output terminal configured to be connected with the electromagnetic generation module, so that a power voltage input by the input terminal is processed by the power source processing circuit on the PCB and then output to the electromagnetic generation module by the output terminal.

8. The refrigerating and freezing device according to claim 1, wherein a storage device with a cylinder body and a door body is placed in one of the storage compartments, and the heating cavity is formed in the storage device; and the electromagnetic heating device further comprises a radiation antenna and a signal processing and measurement control circuit disposed in the cylinder body, the radiation antenna is electrically connected with the signal processing and measurement control circuit, and the electromagnetic generation module is electrically connected with the signal processing and measurement control circuit and is then electrically connected with the radiation antenna.

9. The refrigerating and freezing device according to claim 8, wherein the electromagnetic generation module is disposed at an outer side of a foaming layer of the cabinet body, and the electromagnetic generation module is electrically connected with the signal processing and measurement control circuit through a wire predisposed in the foaming layer of the cabinet body.

* * * * *